United States Patent
Ma et al.

(10) Patent No.: US 11,077,639 B2
(45) Date of Patent: Aug. 3, 2021

(54) SURFACING MATERIALS AND METHOD OF MANUFACTURE

(71) Applicant: WILSONART LLC, Austin, TX (US)

(72) Inventors: Muyuan M Ma, Austin, TX (US); Rajesh Ramamurthy, Temple, TX (US); Jin Chao, Shanghai (CN); Mahesh Subramanian, Centerville, OH (US)

(73) Assignee: WILSONART LLC, Austin, TX (US)

( * ) Notice: Subject to any disclaimer, the term of this patent is extended or adjusted under 35 U.S.C. 154(b) by 0 days.

(21) Appl. No.: 16/438,904

(22) Filed: Jun. 12, 2019

(65) Prior Publication Data

US 2019/0337264 A1 Nov. 7, 2019

Related U.S. Application Data

(63) Continuation-in-part of application No. 16/355,301, filed on Mar. 15, 2019, which is a
(Continued)

(51) Int. Cl.
*B32B 3/26* (2006.01)
*B32B 27/04* (2006.01)
(Continued)

(52) U.S. Cl.
CPC ............ *B32B 3/26* (2013.01); *B05D 3/002* (2013.01); *B05D 3/0254* (2013.01); *B05D 3/065* (2013.01);
(Continued)

(58) Field of Classification Search
None
See application file for complete search history.

(56) References Cited

U.S. PATENT DOCUMENTS

| 3,859,110 A | 1/1975 | Foster |
| 3,935,330 A | 1/1976 | Smith |

(Continued)

FOREIGN PATENT DOCUMENTS

| CA | 2050616 A1 | 3/1992 |
| CN | 1129023 A | 8/1996 |

(Continued)

OTHER PUBLICATIONS

Klick et al., "Excimer Laser Curing of Polymer Coatings," Dec. 1988, Proceedings SPIE, vol. 0998, Excimer Beam Applications (Year: 1988).*

(Continued)

*Primary Examiner* — Jeffrey A Vonch
(74) *Attorney, Agent, or Firm* — Welsh Flaxman & Gitler LLC

(57) ABSTRACT

A textured release sheet includes a substrate, which has been electron beam treated, including a top side and a bottom side. A matte surface is formed on the bottom side thereof, wherein the matte surface of the surfacing material is a coating of an radiation curable material applied to the bottom side of the substrate. The coating is an UV curable acrylate mixture applied to the substrate, wherein the UV curable acrylate mixture is irradiated with UV-radiation via an excimer laser emitter to produce a UV-irradiated layer wherein the UV curable acrylate mixture is only crosslinked on the surface thereof, which produces a matting surface through the effects of a micro-convolution.

4 Claims, 12 Drawing Sheets

Related U.S. Application Data continuation-in-part of application No. 16/154,880, filed on Oct. 9, 2018, now Pat. No. 10,933,608, which is a continuation-in-part of application No. 15/680,679, filed on Aug. 18, 2017.

(60) Provisional application No. 62/377,017, filed on Aug. 19, 2016.

(51) Int. Cl.

| | | |
|---|---|---|
| B32B 27/10 | (2006.01) | |
| B32B 27/16 | (2006.01) | |
| B32B 29/02 | (2006.01) | |
| B32B 29/06 | (2006.01) | |
| B05D 3/00 | (2006.01) | |
| B05D 3/06 | (2006.01) | |
| B05D 5/02 | (2006.01) | |
| B29C 33/42 | (2006.01) | |
| B29C 59/02 | (2006.01) | |
| B29C 59/16 | (2006.01) | |
| B44B 5/00 | (2006.01) | |
| B44C 1/24 | (2006.01) | |
| B44C 5/04 | (2006.01) | |
| B32B 7/06 | (2019.01) | |
| B32B 27/36 | (2006.01) | |
| B32B 29/00 | (2006.01) | |
| C09D 4/00 | (2006.01) | |
| C08J 7/04 | (2020.01) | |
| C08J 7/043 | (2020.01) | |
| C08J 7/046 | (2020.01) | |
| C08J 7/12 | (2006.01) | |
| B05D 3/02 | (2006.01) | |
| B44B 5/02 | (2006.01) | |
| C09D 133/06 | (2006.01) | |
| C09D 5/28 | (2006.01) | |
| C09D 133/08 | (2006.01) | |
| C08J 3/28 | (2006.01) | |
| C08J 3/24 | (2006.01) | |
| B32B 38/06 | (2006.01) | |
| B29C 33/68 | (2006.01) | |
| B29L 31/00 | (2006.01) | |
| B29C 33/56 | (2006.01) | |
| D21H 25/06 | (2006.01) | |
| D21H 19/66 | (2006.01) | |
| B32B 37/26 | (2006.01) | |
| B32B 38/00 | (2006.01) | |

(52) U.S. Cl.
CPC .............. *B05D 3/068* (2013.01); *B05D 5/02* (2013.01); *B32B 7/06* (2013.01); *B32B 27/10* (2013.01); *B32B 27/16* (2013.01); *B32B 27/36* (2013.01); *B32B 29/005* (2013.01); *B32B 38/06* (2013.01); *B44B 5/0052* (2013.01); *B44B 5/026* (2013.01); *B44C 1/24* (2013.01); *B44C 5/0469* (2013.01); *B44C 5/0476* (2013.01); *C08J 3/244* (2013.01); *C08J 3/28* (2013.01); *C08J 7/043* (2020.01); *C08J 7/046* (2020.01); *C08J 7/0427* (2020.01); *C08J 7/123* (2013.01); *C09D 4/00* (2013.01); *C09D 5/28* (2013.01); *C09D 133/06* (2013.01); *C09D 133/08* (2013.01); *B29C 33/424* (2013.01); *B29C 33/56* (2013.01); *B29C 33/68* (2013.01); *B29C 59/026* (2013.01); *B29C 59/16* (2013.01); *B29C 2033/426* (2013.01); *B29L 2031/722* (2013.01); *B32B 29/06* (2013.01); *B32B 2037/268* (2013.01); *B32B 2038/008* (2013.01); *B32B 2038/0076* (2013.01); *B32B 2255/02* (2013.01); *B32B 2255/10* (2013.01); *B32B 2255/26* (2013.01); *B32B 2260/028* (2013.01); *B32B 2260/046* (2013.01); *B32B 2305/72* (2013.01); *B32B 2307/408* (2013.01); *B32B 2307/728* (2013.01); *B32B 2310/0881* (2013.01); *B32B 2451/00* (2013.01); *C08J 2367/02* (2013.01); *C08J 2433/14* (2013.01); *D21H 19/66* (2013.01); *D21H 25/06* (2013.01); *Y10T 156/1039* (2015.01); *Y10T 156/1994* (2015.01); *Y10T 428/24446* (2015.01); *Y10T 428/24479* (2015.01)

(56) References Cited

U.S. PATENT DOCUMENTS

| | | | |
|---|---|---|---|
| 4,169,167 A | 9/1979 | McDowell | |
| 4,284,453 A | 8/1981 | Endrizzi | |
| 4,311,766 A * | 1/1982 | Mattor | B29C 33/62 156/232 |
| 4,327,121 A | 4/1982 | Gray, III | |
| 4,367,110 A | 1/1983 | Yoshikawa | |
| 4,396,448 A | 8/1983 | Ohta | |
| 4,411,931 A * | 10/1983 | Duong | B29C 35/08 427/492 |
| 4,427,732 A * | 1/1984 | Gray, III | B05D 1/40 156/235 |
| 4,789,604 A | 12/1988 | Van Der Hoeven | |
| 4,801,495 A | 1/1989 | Van Der Hoeven | |
| 4,927,572 A | 5/1990 | Van Der Hoeven | |
| 5,453,464 A | 9/1995 | Witzeman et al. | |
| 5,888,617 A | 3/1999 | Roth | |
| 5,976,304 A | 11/1999 | Horvath et al. | |
| 6,001,893 A | 12/1999 | Vaidya et al. | |
| 6,162,842 A | 12/2000 | Freche | |
| 6,333,076 B1 | 12/2001 | Sigel | |
| 6,340,504 B1 | 1/2002 | Neumann et al. | |
| 6,383,644 B2 | 5/2002 | Fuchs | |
| 6,423,167 B1 | 7/2002 | Palmer et al. | |
| 6,447,836 B1 | 9/2002 | Schrof | |
| 6,663,952 B1 | 12/2003 | Mehnert | |
| 6,767,980 B2 | 7/2004 | Yurugi et al. | |
| 7,160,605 B2 | 1/2007 | Fusco | |
| 8,568,849 B2 | 10/2013 | Shi et al. | |
| 9,511,570 B2 | 12/2016 | Nakagawa et al. | |
| 9,707,740 B2 | 7/2017 | Arai | |
| 9,707,746 B2 | 7/2017 | McGuire, Jr. | |
| 9,739,067 B2 | 8/2017 | Zhang | |
| 9,809,013 B2 | 11/2017 | Haller et al. | |
| 2001/0038910 A1 | 11/2001 | MacQueen | |
| 2001/0046590 A1 | 11/2001 | Benton et al. | |
| 2002/0110647 A1 | 8/2002 | Gust | |
| 2003/0003257 A1 | 1/2003 | Kendall | |
| 2004/0089409 A1 | 5/2004 | Kendall et al. | |
| 2005/0208275 A1 | 9/2005 | Abe | |
| 2006/0042492 A1 | 3/2006 | Garitano | |
| 2006/0204729 A1 | 9/2006 | Kobayashi | |
| 2007/0202301 A1 * | 8/2007 | Taniwaki | C08L 75/04 428/143 |
| 2007/0231551 A1 | 10/2007 | Hama | |
| 2008/0057276 A1 | 3/2008 | Rasmusson et al. | |
| 2008/0057300 A1 | 3/2008 | Paiva et al. | |
| 2008/0102271 A1 | 5/2008 | Bilodeau | |
| 2008/0292875 A1 | 11/2008 | Van De Wall | |
| 2009/0047480 A1 | 2/2009 | Juers | |
| 2009/0151866 A1 | 6/2009 | Endert | |
| 2010/0215911 A1 | 8/2010 | Shina | |
| 2011/0024938 A1 | 2/2011 | Tripp | |
| 2011/0042000 A1 | 2/2011 | Wilde et al. | |
| 2011/0052880 A1 | 3/2011 | Iizuka | |
| 2011/0143071 A1 | 6/2011 | Jung | |
| 2011/0151208 A1 | 6/2011 | Huang | |
| 2012/0141733 A1 | 6/2012 | Crosby | |
| 2012/0213973 A1 | 8/2012 | Clement | |

(56) References Cited

U.S. PATENT DOCUMENTS

| | | |
|---|---|---|
| 2012/0231223 A1 | 9/2012 | Lee |
| 2013/0062005 A1 | 3/2013 | Iizuka |
| 2013/0115420 A1 | 5/2013 | Park et al. |
| 2013/0129980 A1 | 5/2013 | Meinhard |
| 2013/0230712 A1 | 9/2013 | Kifuku |
| 2013/0266759 A1 | 10/2013 | Kim et al. |
| 2014/0186610 A1 | 7/2014 | Pervan |
| 2014/0242316 A1 | 8/2014 | Shih et al. |
| 2014/0242871 A1 | 8/2014 | Yasui et al. |
| 2014/0371384 A1* | 12/2014 | Fischer ............... B05D 3/067 524/555 |
| 2015/0191042 A1 | 7/2015 | Ma |
| 2015/0191043 A1 | 7/2015 | Ma et al. |
| 2015/0290910 A1 | 10/2015 | Haller |
| 2015/0354132 A1 | 12/2015 | Schweers |
| 2016/0017167 A1 | 1/2016 | Magnusson et al. |
| 2016/0153190 A1 | 6/2016 | Doehring |
| 2016/0200092 A1 | 7/2016 | Doehring |
| 2016/0375666 A1 | 12/2016 | Free |
| 2017/0197459 A1 | 7/2017 | Gourdin |
| 2017/0210839 A1 | 7/2017 | Lorenz et al. |
| 2018/0001696 A1 | 1/2018 | Greyer |
| 2018/0015691 A1 | 1/2018 | Nagasaki et al. |
| 2018/0015776 A1 | 1/2018 | Wloczysiak et al. |
| 2018/0050527 A1* | 2/2018 | Ma ..................... B32B 7/06 |
| 2019/0077138 A1* | 3/2019 | Ma ..................... B32B 38/06 |
| 2019/0210331 A1* | 7/2019 | Ma ..................... B32B 27/36 |
| 2019/0381821 A1 | 12/2019 | Schmidt |
| 2020/0030845 A1 | 1/2020 | Seo |

FOREIGN PATENT DOCUMENTS

| | | | |
|---|---|---|---|
| DE | 102006042063 A1 | 3/2008 | |
| DE | 102006053662 A1 | 5/2008 | |
| DE | 102008024149 A1 | 12/2009 | |
| DE | 102008060906 A1 | 6/2010 | |
| EP | 0030285 A2 | 6/1981 | |
| EP | 0210620 A2 | 2/1987 | |
| EP | 0287216 A1 * | 10/1988 | ............ B29C 71/04 |
| EP | 0474470 A2 | 3/1992 | |
| EP | 0706834 A1 | 4/1996 | |
| EP | 1304236 A | 4/2003 | |
| EP | 2527408 A1 | 11/2012 | |
| EP | 2857221 A1 | 4/2015 | |
| EP | 2527408 B1 * | 7/2015 | ............ C09D 4/00 |
| EP | 2920232 B1 | 1/2017 | |
| JP | 57170718 A | 10/1982 | |
| JP | 62085926 A | 4/1987 | |
| JP | S63307945 A | 12/1988 | |
| JP | 02231116 A | 9/1990 | |
| JP | 03275316 A | 12/1991 | |
| JP | 05092696 A | 4/1993 | |
| JP | 05269931 A | 10/1993 | |
| JP | H10180758 A | 7/1998 | |
| JP | H11268192 A | 10/1999 | |
| JP | 3789694 B2 | 6/2006 | |
| JP | 2008173774 A | 7/2008 | |
| JP | 2008173774 A * | 7/2008 | |
| JP | 2011136510 A * | 7/2011 | |
| JP | 4978226 B2 | 7/2012 | |
| JP | 2017128634 A | 7/2017 | |
| JP | 2017171794 A | 9/2017 | |
| KR | 20080092591 A | 10/2008 | |
| KR | 101317063 B1 | 10/2013 | |
| KR | 20180010635 A | 1/2018 | |
| WO | 8806973 A1 | 9/1988 | |
| WO | 9856990 A1 | 12/1998 | |
| WO | 2007068322 A1 | 6/2007 | |
| WO | 2012122206 A1 | 9/2012 | |
| WO | 2013057214 A1 | 4/2013 | |
| WO | 2013133862 A1 | 9/2013 | |
| WO | 2013154695 A2 | 10/2013 | |
| WO | 2014003389 A1 | 1/2014 | |
| WO | 2014075804 A1 | 5/2014 | |
| WO | 2017076901 A2 | 5/2017 | |
| WO | 2018096033 A1 | 5/2018 | |
| WO | WO-2018096033 A1 * | 5/2018 | ............ B44C 1/24 |
| WO | 2019034675 A1 | 2/2019 | |

OTHER PUBLICATIONS

Machine Translation of EP-2527408-B1, Jul. 2015 (Year: 2015).*
Machine Translation of JP-2008173774-A, Jul. 2008 (Year: 2008).*
Machine Translation of JP-2011136510-A, Jul. 2011 (Year: 2011).*
Machine Translation of WO-2018096033-A1, May 2018 (Year: 2018).*
Radtech et al., UV/EB Brochure, Nov. 2018 <https://www.radtech-europe.com/sites/default/files/rte_uveb_brochure_2018_0.pdf> (Year: 2018).*
Bohm et al., Surface treatment of components by the use of lasers to increase the wettability and to improve the adhesion, Jan. 2002 (Year: 2002).*
Zenkiewicz, Abstract for Effects of electron-beam irradiation on wettability and surface free energy of a polypropylene film, Jan. 2005, International Journal of Adhesion and Adhesives, vol. 25, Issue 1, pp. 61-66 (Year: 2005).*
Ali El-Saftawy, Studying electron-beam-irradiated PET surface wetting and free energy, Feb. 2014, Nuclear Instruments and Methods in Physics Research Section B Beam Interactions with Materials and Atoms, vol. 322, pp. 48-53 (Year: 2014).*
Basu et al., Mechanism of wrinkle formation in curing coatings, May 2005, Progress in Organic Coatings, vol. 53, Issue 1 (Year: 2005).
Schubert et al., VUV-induced micro-folding of acrylate-based coatings: 1. Real-time methods for the determination of the micro-folding kinetics, Mar. 2009, Surface and Coatings Technology, vol. 203, Issue 13 (Year: 2009).
Schubert et al., VUV-induced micro-folding of acrylate-based coatings: 2. Characterization of surface properties, Sep. 2009, Surface and Coatings Technology, vol. 203, Issue 24 (Year: 2009).
Bauer et al., UV curing and matting of acrylate nanocomposite coatings by 172 nm excimer irradiation Part 2, Nov. 2010, Progress in Organic Coatings, vol. 69, Issue 3 (Year: 2010).
Gan et al., Self-wrinkling induced by the photopolymerization and self-assembly of fluorinated polymer at air/liquid interface, Sep. 2014, Journal of Materials Chemistry A, vol. 2 (Year: 2014).

* cited by examiner

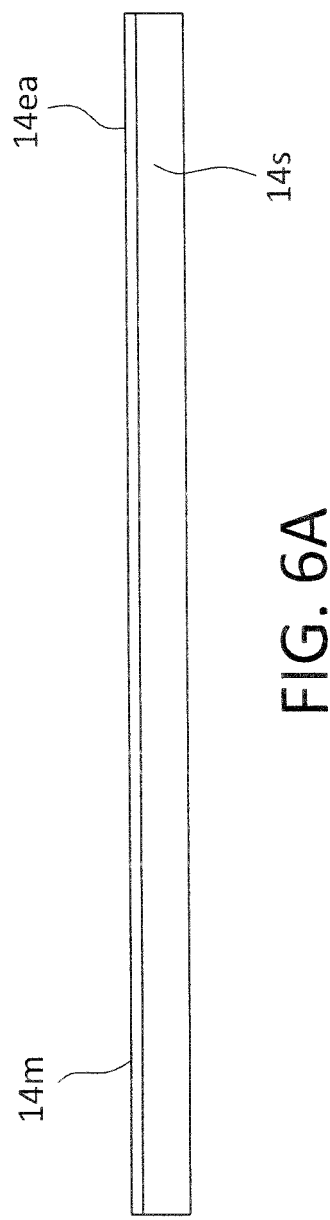
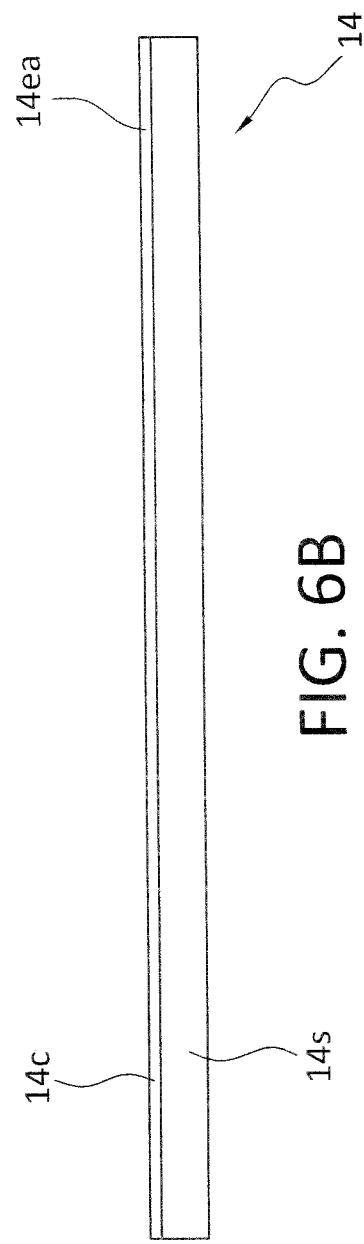

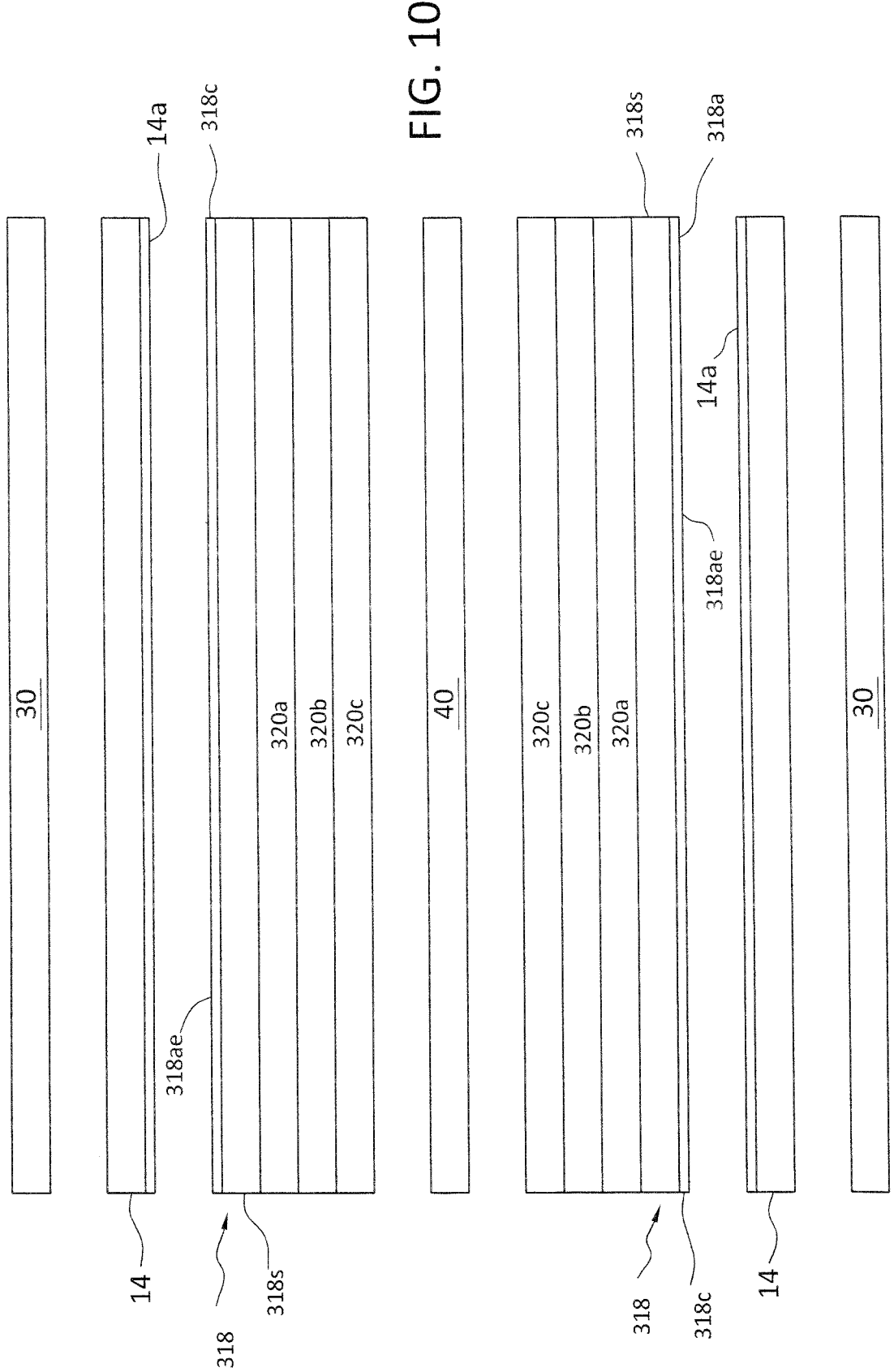

SURFACING MATERIALS AND METHOD OF MANUFACTURE

CROSS REFERENCE TO RELATED APPLICATION

This application is a continuation-in-part of U.S. patent application Ser. No. 16/355,301, entitled "SURFACING MATERIALS AND METHOD OF MANUFACTURE," filed Mar. 15, 2019, which application is a continuation-in-part of U.S. patent application Ser. No. 16/154,880, entitled "DECORATIVE LAMINATE WITH MATTE FINISH AND METHOD OF MANUFACTURE," filed Oct. 9, 2018, which is a continuation-in-part of U.S. patent application Ser. No. 15/680,679, entitled "DECORATIVE LAMINATE WITH MATTE FINISH AND METHOD OF MANUFACTURE," filed Aug. 18, 2017, which claims the benefit of U.S. Patent Application Ser. No. 62/377,017, entitled "DECORATIVE LAMINATE WITH MATTE FINISH AND METHOD OF MANUFACTURE," filed Aug. 19, 2016.

BACKGROUND OF THE INVENTION

Field of the Invention

The present invention generally relates to surfacing materials and methods for manufacturing the materials.

2. DESCRIPTION OF THE RELATED ART

High pressure decorative laminates are currently manufactured with smooth glossy surfaces, textured surfaces, or deeply sculpted and embossed surfaces. As general background, decorative laminates prepared by heat and pressure consolidation have been produced commercially for a number of years, and have found widespread acceptance in the building and furniture industry as countertop and tabletops, bathroom and kitchen work surfaces, wall paneling, flooring products, partitions and doors. These decorative laminates may be described as containing a number of laminae consolidated to form a unitary structure carrying a surface decoration. The surface decoration may range from something as simple as a solid color to something as complex as an embossed simulated wood grain finish.

Decorative laminates generally include plural layers of synthetic resin impregnated paper sheets bonded under heat and pressure to form a unitary structure. In normal practice, a decorative laminate sheet assembly, from the bottom up, includes a core of one or more phenolic resin impregnated sheets, above which lies a decorative melamine-formaldehyde impregnated sheet. The decorative sheet may be further covered with a melamine-formaldehyde impregnated overlay. The core, or base, functions to impart rigidity to the decorative laminate and usually includes a solid substrate which may, or may not, be formed prior to the initial laminating steps. Prior to stacking, the sheets of the core member are impregnated with a water alcohol solution of phenol formaldehyde, dried and partially cured in a hot oven, and finally cut into shapes.

The core may, for example, include a plurality of sheets of 90-150 pound phenolic resin impregnated Kraft paper. The Kraft paper is impregnated throughout and bonded with a substantially completely cured phenolic resin which has been converted to a thermoset state during the initial laminating step. The substrate may be a pre-cured plastic laminate, such as glass fiber-reinforced thermoset polyester resin laminates and the like, a wood product, such as hardboard, wood waste or particle boards, plywood and the like, a mineral base board, such as, cement-asbestos board, sheet rock, plaster board, and the like, or a combination of substrates.

The decorative sheet provides the decorative laminate with an attractive appearance. The decorative sheet also dictates the surface characteristics of the decorative laminate. For example, the composition of the decorative sheet dictates the decorative laminate's resistance to chemical agents, heat, light, shock and abrasion. Decorative sheets are commonly manufactured from high quality 50-125 pounds per 3,000 square ft. ream basis weight (80-202 grams per square meter), pigment filled, alpha-cellulose paper impregnated with a water alcohol solution of melamine-formaldehyde resin. The resin impregnated decorative sheets are subsequently dried, partially cured, and finally cut into sheets. The pigment filled, alpha-cellulose paper of the decorative sheet, may include a solid color, a decorative design, or a roto-gravure reproduction of natural materials, such as, wood, marble, leather, etc. The aesthetic characteristics of the cellulose paper are revealed as the laminate's decorative design upon completion of the decorative laminate.

Decorative laminates are generally manufactured by placing the resin impregnated core and decorative sheet between steel plates and subjecting the decorative laminate stack to heat and pressure for a time sufficient to consolidate the laminate and cure the resins (generally about 25 minutes to an hour). The pressure and heat force the resin in the paper sheets to flow, cure, and consolidate the sheets into a unitary laminated mass referred to in the art as a decorative high pressure laminate. Finally, the formed decorative laminate is bonded to a reinforcing substrate, such as, plywood, hardboard, asbestos board, particle board or the like.

Generally, more than one laminate is formed at one time. Multiple laminates are formed by inserting a plurality of decorative laminate sheet assemblies into a stack. Release sheets are positioned between the decorative laminate sheet assemblies to separate the various laminates stacked together. After consolidation, the release sheets allow the individual laminates to be separated.

Textured decorative laminates are also very popular. The textured surfaces range from relatively shallow depressions, such as, textured (e.g., satin, matte or semi-gloss) surfaces, to relatively deeply sculpted or embossed surfaces having a noticeable three-dimensional effect, such as, wood grain, leather, slate, abstract patterns, creative designs etc. The textured laminates are commonly manufactured using release sheets with the desired surface texture, which surface texture is imparted to the decorative laminate during the application of heat and pressure in the manufacturing process.

It has, however, been found that high pressure decorative laminates are susceptible to a build-up of fingerprints as the surface of the high pressure decorative laminate is touched during the course of the day. The fingerprints remain visible and can become highly distracting. Prior attempts to address this problem have relied upon chemically modified surfaces to achieve the purpose. However, such attempts have only led to limited success. As such, a need remains for a high pressure decorative laminate that is not susceptible to the build-up of fingerprints on the surface thereof.

SUMMARY OF THE INVENTION

It is, therefore, an object of the present invention to provide a textured release sheet including a substrate, which has been electron beam treated, including a top side and a bottom side. The textured release sheet includes a matte surface formed on the bottom side thereof, wherein the matte surface of the surfacing material is a coating of an radiation curable material applied to the bottom side of the substrate. The coating is an UV curable acrylate mixture applied to the substrate, wherein the UV curable acrylate mixture is irradiated with UV-radiation via an excimer laser emitter to produce a UV-irradiated layer. The UV curable acrylate mixture is only crosslinked on the surface thereof, which produces a matting surface through the effects of a micro-convolution.

It is also an object of the present invention to provide a textured release sheet wherein the UV-irradiated layer is then subjected to irradiation to crosslink and harden the entire layer.

It is another object of the present invention to provide a textured release sheet wherein the UV curable acrylate mixture is applied to the substrate with a layer thickness of not more than 150 microns.

It is a further object of the present invention to provide a textured release sheet wherein the epoxy acrylic or urethane acrylic is applied to the substrate with a layer thickness in the range between 30 and 100 microns.

It is also an object of the present invention to provide a textured release sheet wherein the substrate is a PET film.

It is another object of the present invention to provide a laminate lay-up including a release sheet composed of a release sheet substrate, which has been electron beam treated, including a top side and a bottom side, and a matte surface formed on the bottom side thereof. The matte surface of the surfacing material is a coating of an radiation curable material applied to the bottom side of the substrate, the coating being an UV curable acrylate mixture applied to the substrate. The UV curable acrylate mixture is irradiated with UV-radiation via an excimer laser emitter to produce a UV-irradiated layer wherein the UV curable acrylate mixture is only crosslinked on the surface thereof, which produces a matting surface through the effects of a micro-convolution. The laminate lay-up also includes a decorative layer, which has been electron beam treated, and a core layer composed of one or more sheets of paper impregnated with resin.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 6A and 6B are schematics showing the fabrication of the release sheet in accordance with the present invention.

FIG. 10 is a schematic of a multi-laminate pressing assembly in accordance with the embodiment of FIG. 8.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Figure 1:
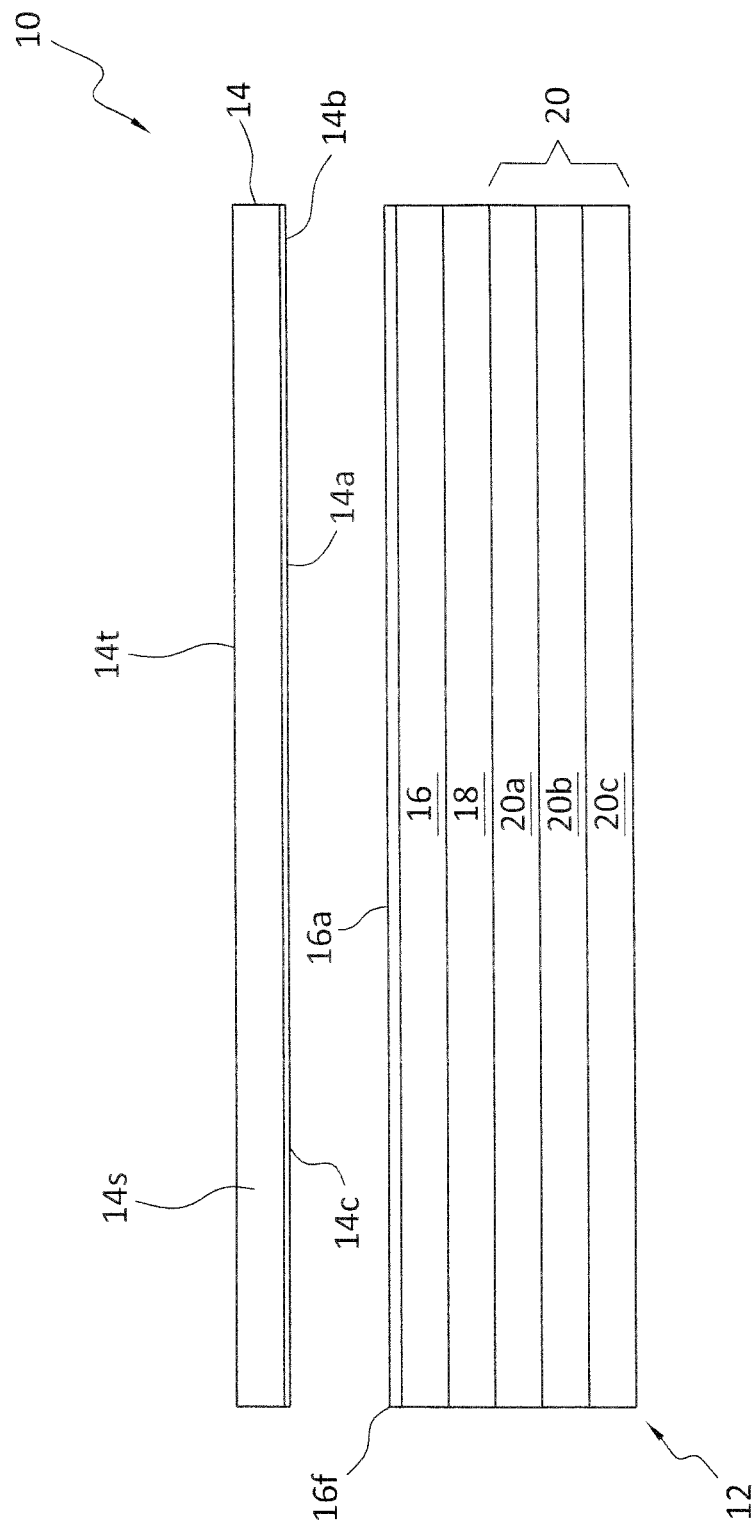
FIG. 1 is a schematic of a laminate lay-up in accordance with an embodiment of the present invention.
Figure 2:
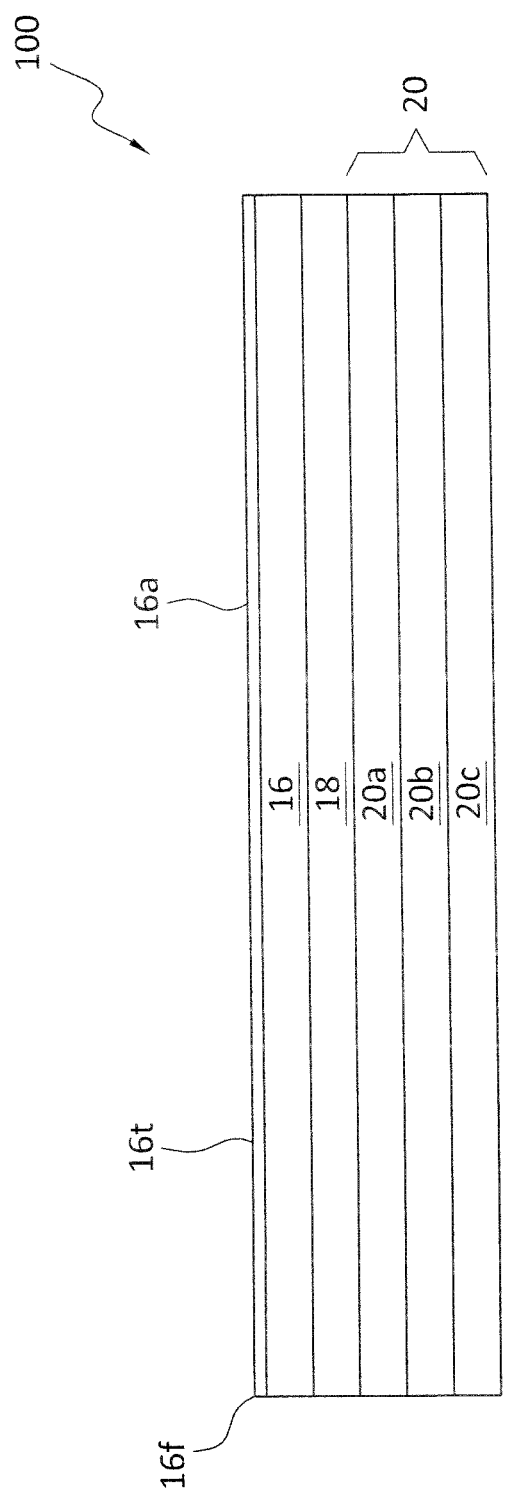
FIG. 2 is a schematic of a high pressure decorative laminate produced in accordance with the present invention.
Figure 3:
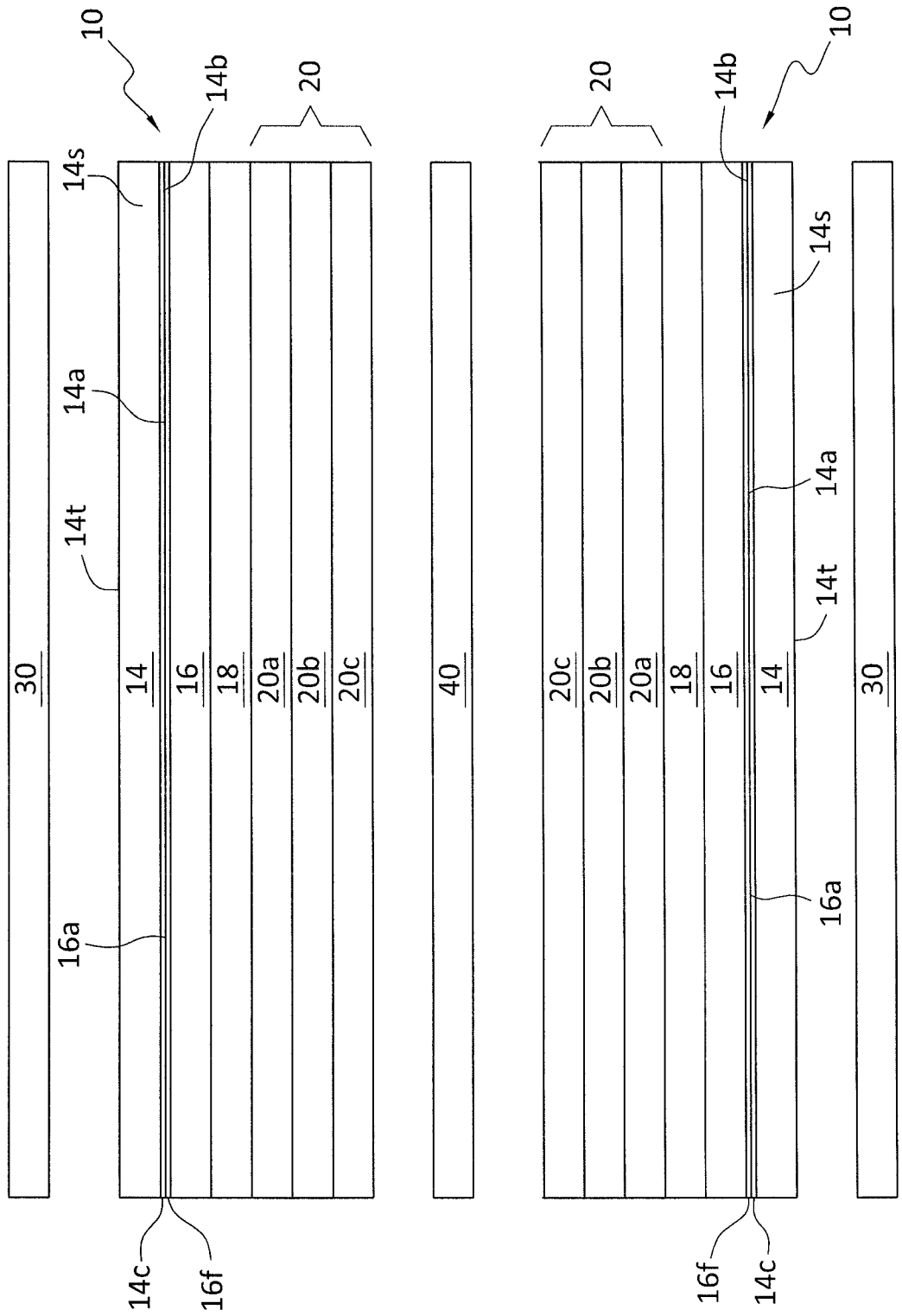
FIG. 3 is a schematic of a multi-laminate pressing assembly in accordance with the present invention.
Figure 4:
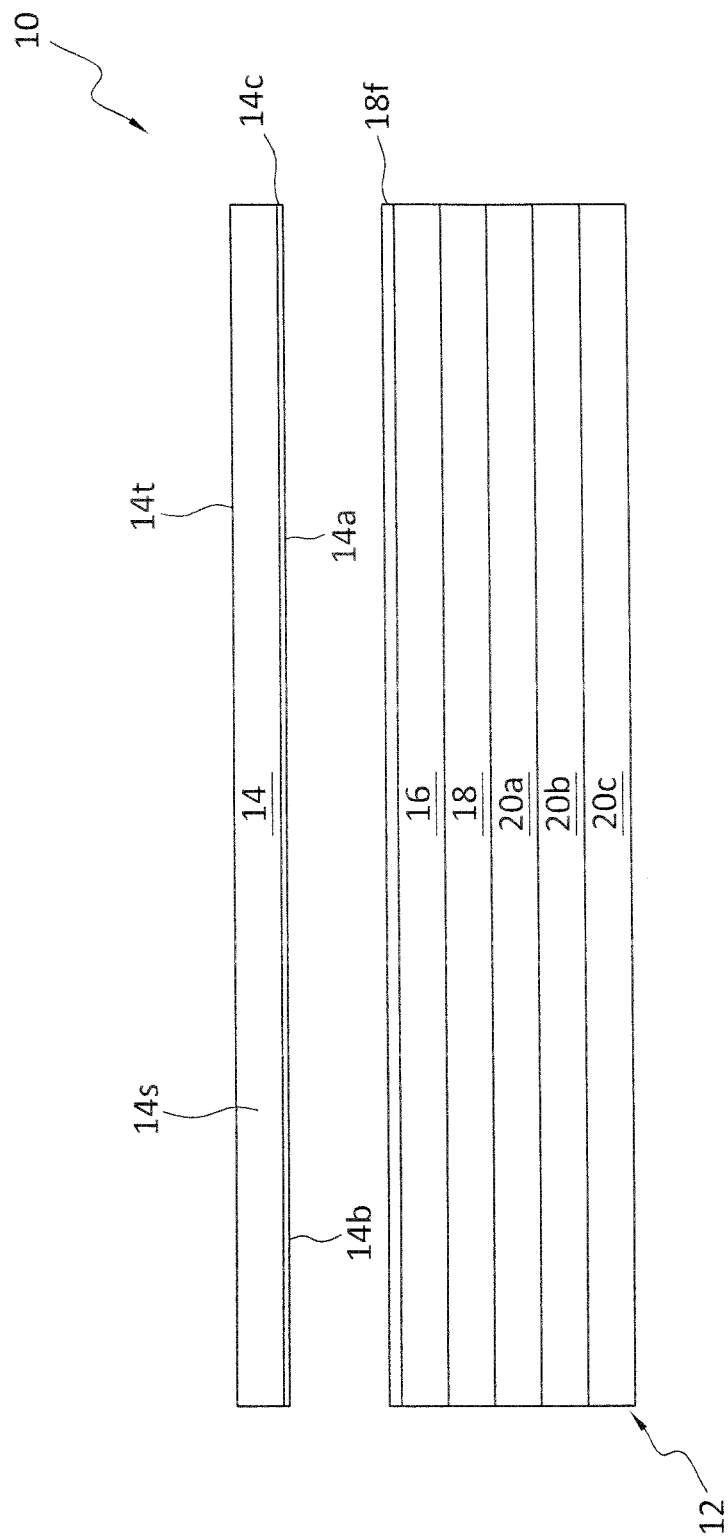
FIG. 4 is a schematic of a laminate lay-up in accordance with an alternate embodiment.
Figure 5:
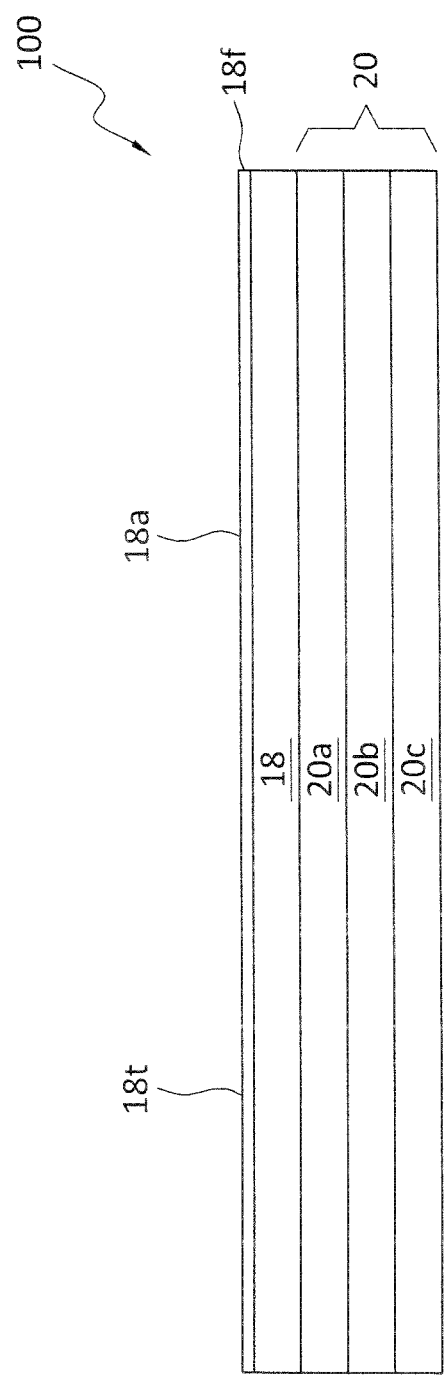
FIG. 5 is a schematic of a high pressure decorative laminate in accordance with the alternate embodiment disclosed with reference to FIG. 4.

With reference to FIGS. 1, 2 and 3, a decorative laminate lay-up 10 including a decorative laminate sheet assembly 12 (composed of an exterior overlay paper layer 16, a decorative layer 18, and a core layer 20 as discussed below in greater detail) and a texture imparting member in the form of a textured release sheet 14 (including a top side 14t and a bottom side 14b) is disclosed. As will be explained below in accordance with an alternate embodiment, the decorative laminate lay-up may be assembled without an overlay paper layer. The decorative laminate lay-up 10 is used in the manufacture of decorative laminates 100 (see FIG. 2) in accordance with an embodiment of the present invention. The textured release sheet 14 imparts a textured matte surface 14a (formed on the bottom side 14b thereof) to a resulting decorative laminate 100, wherein the textured matte surface 14a of the textured release sheet 14 results in a decorative laminate 100 that exhibits a matte appearance and is not susceptible to a build-up of fingerprints on the surface thereof. It is further appreciated the release sheet 14 also functions as a release mechanism between decorative laminate sheet assemblies 12 when subjected to heat and pressure in a conventional platen press manufacturing process. With this in mind, the textured release sheets 14 of the present invention may be used in gang processing of decorative laminates 100 or the present textured release sheets 14 may be used in the manufacture of single decorative laminate to simply impart a desired matte surface.

The decorative laminate lay-up 10 is assembled by first stacking a decorative laminate sheet assembly 12 having a top layer (which, as explained below, is preferably an overlay paper sheet 16). That is, the sheets used in the production of the decorative laminate 100 are stacked in preparation for the heating and pressure steps used to consolidate the laminate. A textured release sheet 14 composed of a substrate 14s and a textured coating layer 14c defining the textured matte surface 14a is also prepared.

The process for producing surface effects in a release coating as disclosed in European Patent Application Publication No. 2527408, entitled "Method for Producing a Film with a Matt Surface," which is incorporated herein by reference, is employed in the manufacture of textured release sheets 14 for use in accordance with the present invention. Briefly, the '408 publication teaches a technique for producing surface effects on a sheet. In accordance with the disclosed methodology a coating of an electron beam radiation curable material is applied to one surface of a web substrate, and subsequently cured (ultimately producing the textured coating layer 14c with the textured matte surface 14a of the release sheet 14 in accordance with the present invention). The surface forming techniques of the '408 publication result in a film (or textured release sheet 14 in accordance with the present invention) with a textured matte surface 14a. The textured matte surface 14a exhibits good matting properties (and correspondingly low degrees of gloss as defined in and measured in accordance with DIN EN ISO 2813) having improved scratch resistance properties. Ultimately, and as will be explained below in greater detail, the film produced as a result of the manufacturing process disclosed in the '408 publication is ultimately utilized as a release sheet in the manufacture of decorative laminate.

The material produced in accordance with the '408 publication is sold under the name FENIX NTM™. FENIX NTM™ is described as a super opaque nanotech material that is an innovative interior design product, created by Arpa Industriale. FENIX NTM™ combines elegant aesthetic solutions with state-of-the-art technological performance. The external surface of FENIX NTM™ employs nanotechnology and is characterized by next generation acrylic resins, hardened and fixed with electron beam curing.

With reference to FIGS. 6A & 6B, the release sheet 14 of the present invention (as produced in accordance with the '408 publication), employs a solvent-free and non-aqueous lacquer (in accordance with the present invention the lacquer is preferably an epoxy acrylic or a urethane acrylic (also referred to herein as the acrylate mixture)) in the production of the textured coating layer 14c on the substrate 14s. The matte release sheet 14 employed in accordance with the present invention is produced through the implementation of a multi-stage irradiation process. First, and with reference to FIG. 6A, the UV curable acrylate mixture, that is, epoxy acrylic or urethane acrylic 14ea, (which is ultimately cured to form the textured coating layer (or otherwise referred to herein as the UV cured coating) 14c) is laid, or otherwise applied, upon the substrate 14s and the UV curable acrylate mixture 14ae is irradiated with UV-radiation to a create a UV-irradiated layer 14m. However, the irradiation is applied so that UV curable acrylate mixture 14ea is neither hardened nor is the entire layer of UV curable acrylate mixture 14ae crosslinked. Rather the UV curable acrylate mixture 14ea is only crosslinked on the surface thereof, which produces a matting surface through the effects of a micro-convolution. In accordance with a preferred embodiment, the UV-radiation irradiates at a wavelength of approximately 172 nm. It is, however, appreciated excimer emitter based on a Xe-emission spectrum is known, which might be particularly favorable for a large-scale production.

Referring to FIG. 6B, the UV-irradiated layer 14m (on the substrate 14s) is then subjected to an electron beam irradiation to crosslink and harden the entire layer and form the final textured UV cured coating 14c of the release sheet 14.

This procedure initially creates a shrinking process in the UV curable acrylate mixture 14ea that ultimately becomes the epoxy acrylic or urethane acrylic textured UV cured coating 14c and thus the desired matting directly on the surface of the resulting release sheet 14. The production of a textured matte surface 14a is achieved according to the '408 publication with 100% lacquers, to which no separate matting agent (such as silica or the like) is added. The curing and cross-linking of the total layer by means of electron beam irradiation fixes the matte surface created by the partial curing and irradiation without influencing the matte surface in any adverse manner. The matte release sheet 14 produced in this manner is distinguished by outstanding matting properties, which gloss levels to less than 3 (measured in accordance with the cited DIN EN ISO 2813 and 60° geometry) or less than 5 (corresponding at 85° geometry) can be reached.

In accordance with a preferred embodiment, the UV curable acrylate mixture 14ea is preferably applied to the substrate 14s by a roller, with a layer thickness greater than 5 microns and up to approximately 150 microns (preferably, 30 to 100 microns). The substrate 14s is selected from various substrate plastic materials, such as polyethylene terephthalate (PET) polyester or the like, as well as films made of metal or paper material. In accordance with a preferred embodiment, a plastic film substrate of PET, layer thickness 150 microns, is coated by flexographic printing with an epoxy acrylic or urethane acrylic mixture to produce a coating thickness of greater than 30 microns and up to approximately 150 microns (preferably, 40 to 80 microns), wherein the acrylate mixture, in accordance with one embodiment, has the following composition as disclosed in the '408 publication:

| | |
|---|---|
| 100 T (Parts) | NeoRad ® U 6288 (a 100% UV curable resin, which can be used in coatings and overprint varnishes for luxury packaging and high end promotional printing. NeoRad ® U-6288 offers broad formulating latitude and high matte efficiency, working with most common matting agents. In particular, it is a UV curable urethane acrylate. It exhibits good adhesion, hardness, yellowing and improved flow. It has high matte efficiency, very good flexibility and excellent shrinkage. It also exhibits superior chemical- and abrasion-resistance.). |
| 10 T (Parts) | Ebecryl ® 5129 (a hexafunctional aliphatic urethane acrylate oligomer which provides fast cure response when exposed to ultraviolet light or electron beam. Cured films of Ebecryl ® 5129 exhibit high hardness, abrasion and solvent resistance combined with a good flexibility). |
| 40 T (Parts) | $TiO_2$ pigments |
| 10 T (Parts) | Matting agents | where NeoRad® U 6288 is a mixture of oligomer and monomer.

The UV curable acrylate mixture is preferably Ebecryl® 5129 added with a proportion of 5 to 10 weight percent of the total acrylate mixture, and there are titanium dioxide pigments of an average particle size of 0.1 microns admixed as white pigmentation. The substrate 14s coated with the UV curable acrylate mixture 14ea is then is passed under an inert gas in a continuous (in-line) process under a 172 nm excimer laser emitter, with a typical feed of 60 m/min at 0.5 cm distance from the coating surface. The result is a partially cured surface, that is, the UV-irradiated layer 14m with a surface matting of gloss <4 (60° geometry, measured as before) which immediately is subjected thereafter to an electron beam crosslinking (and hence hardening) of the UV curable acrylate mixture 14ea to form the final, fully hardened epoxy acrylic or urethane acrylic textured UV cured coating 14c with a radiation absorbed dose of 30 kGy.

In accordance with an alternate embodiment, the UV curable acrylate mixture is as follows:

| | |
|---|---|
| 42% | Ebecryl ® 294/HD 25 (an aliphatic urethane triacrylate oligomer diluted with 1,6-hexanediol diacrylate (HDDA)(1) monomer.). |
| 38% | Ebecryl ® 5129 (a hexafunctional aliphatic urethane acrylate oligomer which provides fast cure response when exposed to ultraviolet light or electron beam.). |
| 9% | Ebecryl ® 8209 (a Sn-free aliphatic urethane acrylate oligomer which provides extremely fast cure response when exposed to ultraviolet (UV) light or electron beam (EB).). |
| 5% | HDDA/TMPTA (Hexanediol diacrylate (HDDA) is a difunctional reactive diluent that is commonly used as a component of ultraviolet light (UV) and electron beam (EB) |

| | curable coatings and inks. Trimethylolpropane triacrylate (TMPTA) is a trifunctional monomer used for its low volatility and fast cure response.) |
|---|---|
| 2% | Photoinitiator |
| 2% | Cerafak 127N (a Fischer Tropsch wax dispersion. Provides improved water repellence properties.). |
| 1% | TBPB (tert-Butyl peroxybenzoate (TBPB) a chemical compound from the group of peresters which functions as a radical initiator in a polymerization process. |
| 1% | Modaflow 9200 (an acrylic flow modifier, without silicone addition. It improves flow and leveling, substrate wetting, or maintains high gloss and substrate and inter-coat adhesion, and facilitates pigment dispersion). |

Figure 7A:
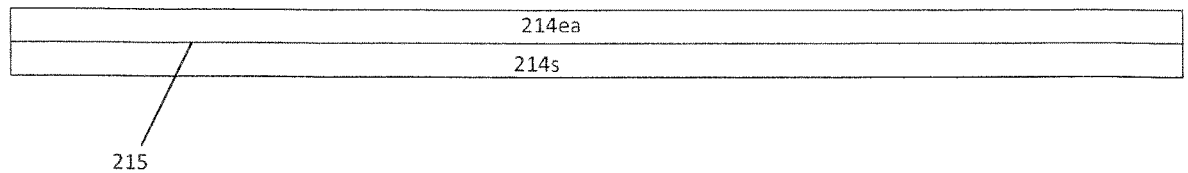
FIGS. 7A, 7B and 7C are schematics showing the formation of the release sheet in accordance with an alternate embodiment.
Figure 7B:
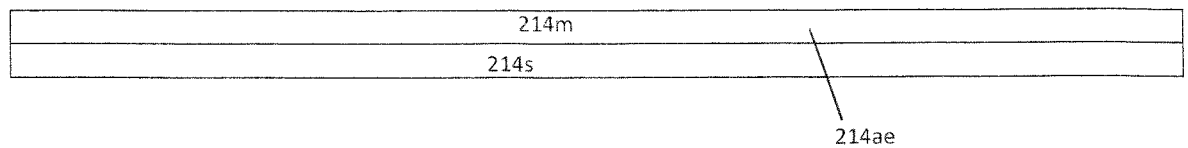
Figure 7C:
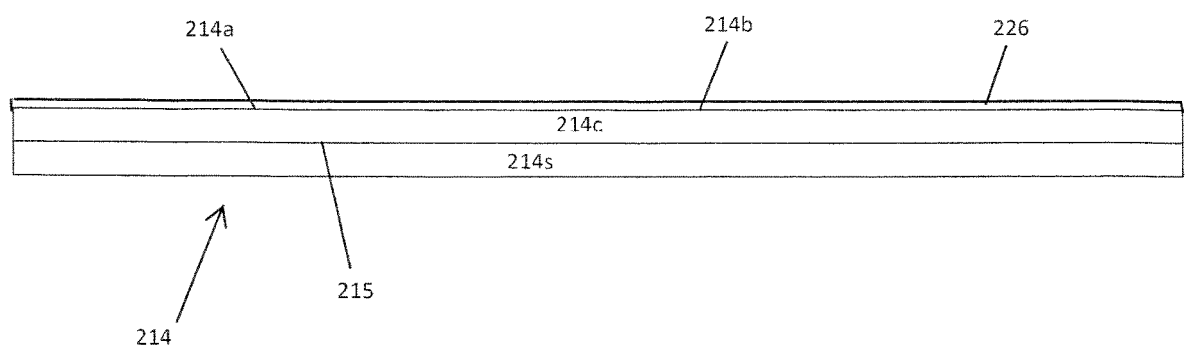

In accordance with an alternate embodiment for the fabrication of the release sheet, and with reference to FIGS. 7A to 7C, the textured release sheet 214 is a substrate of a PET (Polyethylene Terephthalate) film 214s treated with a UV cured coating 214c that has been cured in a highly specific manner. While a PET film is disclosed herein in accordance with a preferred embodiment of the present invention, other film materials may be used so long as they exhibit thermal performance equal or better than that exhibited by the PET film. The PET film 214s forms the substrate of the textured release sheet 214, and is coated along its lower surface 215, that is, the surface that will be facing the laminate lay-up 10 in facing relationship with the decorative layer 18, with a textured UV cured coating 214c, that ultimately defines the bottom surface 214b of the release sheet 214.

The textured UV cured coating 214c is preferably composed of a solvent-free and non-aqueous lacquer (in accordance with the present invention the lacquer is preferably a UV cured epoxy acrylic or urethane acrylic (which is referred to below as the UV curable acrylate mixture)) applied to the PET film 214s in the production of the textured UV cured coating 214c of the textured release sheet 214.

The textured release sheet 214 of this embodiment is produced through the implementation of a multi-stage curing process. The PET film 214s in accordance with the present embodiment is MYLAR.

Once the PET film 214s is prepared as described above, it is treated with electron beam irradiation to prepare the surface of the PET film for coating with a UV curable acrylate mixture as discussed below. This treatment improves the wettability of the PET film. The UV curable acrylate mixture 214ea (which is ultimately cured to form the textured UV cured coating 214c) is then applied upon the PET film 214s (see FIG. 7A) and is irradiated with LED precure and excimer UV to create a UV-irradiated layer 214m having a surface exhibiting micro-folding (see FIG. 7B). In particular, the radiation is applied so that UV curable acrylate mixture 214ea is neither hardened nor is the entire layer of UV curable acrylate mixture 214ea crosslinked. Rather the UV curable acrylate mixture 214ea is only crosslinked on the surface thereof, which produces a super-matting surface through the effects of a micro-convolution. In accordance with a preferred embodiment, the UV-radiation irradiates via an excimer laser emitter based on a Xe-emission spectrum at a wavelength of 172 nm in the presence of nitrogen.

The UV-irradiated layer 214m is then fully cured by E-beam or UV irradiation (i.e. 200-400 nm). In particular, the UV-irradiated layer 214m partially cured by excimer can also be subjected to an electron beam irradiation to crosslink and harden the entire layer and form the final textured coating layer of the exterior protective layer without the UV-irradiation.

The curing process described above is similar to that disclosed in European Patent Application Publication No. 2527408, entitled "Method for Producing a Film with a Matt Surface," which is incorporated herein by reference. Briefly, the '408 publication teaches a technique for producing surface effects on a sheet. In accordance with the disclosed methodology a coating of an electron beam radiation curable material is applied to one surface, and is subsequently cured (ultimately producing the textured UV cured coating 214c with the textured matte surface 214a and in accordance with the present invention). The surface forming techniques of the '408 publication result in a textured matte surface 214a and exhibits good matting properties (and correspondingly low degrees of gloss as defined in and measured in accordance with DIN EN ISO 2813) having improved scratch resistance properties.

In accordance with a preferred embodiment, the UV cured acrylate mixture 214ea is preferably applied to the PET film 214s by a roller, with a layer coating thickness of greater than 30 microns and up to approximately 150 microns (preferably, 40 to 80 microns), wherein the UV cured acrylate mixture.

The UV curable acrylate mixture 214ea is composed of a formulation having the following composition:
60% to 90%, by weight, urethane acrylate;
8% to 38%, by weight, reactive diluent, such as, isobornyl acrylate;
1.0% to 10%, by weight, photo initiator, for example, a combination of 0.5% to 5% by weight benzophenone and 0.5% to 5% by weight triethanol amine; and
0.5% to 5%, by weight, a thermal initiator, for example, tert-Butyl peroxybenzoate.

In accordance with one embodiment, the UV curable acrylate mixture 214ea has the following composition (when electron beam is used to complete the final curing, no photoinitiators will be used in the formulation):

| | |
|---|---|
| 42% | Ebecryl ® 294/HD 25 (an aliphatic urethane triacrylate oligomer diluted with 1,6-hexanediol diacrylate (HDDA)(1) monomer.). |
| 38% | Ebecryl ® 5129 (a hexafunctional aliphatic urethane acrylate oligomer which provides fast cure response when exposed to ultraviolet light or electron beam.). |
| 9% | Ebecryl ® 8209 (a Sn-free aliphatic urethane acrylate oligomer which provides extremely fast cure response when exposed to ultraviolet (UV) light or electron beam (EB).). |
| 5% | HDDA/TMPTA (Hexanediol diacrylate (HDDA) is a difunctional reactive diluent that is commonly used as a component of ultraviolet light (UV) and electron beam (EB) curable coatings and inks. Trimethylolpropane triacrylate (TMPTA) is a trifunctional monomer used for its low volatility and fast cure response.) |
| 2% | Photoinitiator |
| 2% | Cerafak 127N (a Fischer Tropsch wax dispersion. Provides improved water repellence properties.). |
| 1% | TBPB (tert-Butyl peroxybenzoate (TBPB) a chemical compound from the group of peresters which functions as a radical initiator in a polymerization process, that is, a thermal initiator). |
| 1% | Modaflow 9200 (an acrylic flow modifier, without silicone addition. It improves flow and leveling, substrate wetting, or maintains high gloss and substrate and inter-coat adhesion, and facilitates pigment dispersion). |

Once the final curing is completed, the upper surface of the textured release sheet 214, that is, the surface coated with the textured UV cured coating 214c, is coated with a $TiB_2$ hard coating 226 to protect the micro-structure for longevity after the HPL/LPL pressing thereof is completed. The textured release sheet 214 is coated with $TiB_2$ using the technique disclosed in U.S. Patent Application Publication No. 2017/0226630, entitled "METHOD FOR COATING STAINLESS STEEL PRESS PLATES AND COATED PRESS PLATES PRODUCED THEREBY", which is incorporated herein by reference.

It should be appreciated that while the release sheet 14 of the embodiment disclosed with reference to FIGS. 6A and 6B is shown in conjunction with the fabrication processes shown in FIGS. 1, 3, 4, 8, and 10, the release sheet 214 disclosed above with reference to FIGS. 7A, 7B, and 7C could replace the previously disclosed release sheet (and is therefore referenced in the disclosure below).

With the laminate sheet assembly 12 and the finished release sheet 14, 214 prepared, the finished release sheet 14 is positioned on the top surface 16a (in the case of the present laminate sheet assembly 12 it is positioned on the upper surface of the overlay sheet 16) of the laminate sheet assembly 12 to form the laminate lay-up 10. The release sheet 14, 214 is positioned on the overlay sheet 16 with the bottom side 14b, 214b (that is, the textured matte surface 14a, 214a) of the release sheet 14, 214 facing the top surface 16a of the overlay sheet 16.

Heat and pressure are then applied to the laminate sheet assembly 12 and the textured release sheet 14, 214 using press plates in a conventional manner. The heat and pressure are applied in manner sufficient to bond the layers of the decorative laminate sheet assembly 12, and releasably bond the textured release sheet 14, 214 (in particular, the bottom side 14b, 214b with the textured matte surface 14a, 214a) to the top surface 16a of the decorative laminate sheet assembly 12. The heat and pressure also effectuate the final curing where peroxide is integrated into the textured release sheet (as in the case of the second acrylate mixture embodiment disclosed above). Finally, the textured release sheet 14, 214 is removed from the top layer 16a of the formed decorative laminate 100 to reveal a decorative laminate 100 exhibiting desired matte texture characteristics.

In accordance with an embodiment of the present invention, and as discussed above, the release sheet 14, 214 is formed with a textured matte surface 14a, 214a on the bottom side 14b, 214b thereof (the texture of which is ultimately applied to the top surface 16a of the decorative laminate 100) exhibiting matte surface characteristics leading to a fingerprint proof surface, that is, a surface not showing fingerprints and remaining clean and clear despite regular use. As discussed above, the release sheet 14, 214 is preferably an acrylic coated PET sheet, the acrylic coating of which is applied in accordance with the procedure disclosed in the '408 publication.

The texture of the textured matte surface 14a, 214a applied to the release sheet 14, 214 is ultimately applied to the top surface 16a of the resulting decorative laminate 100 as texture 16t resulting in a textured top surface 16a of the resulting decorative laminate 100) with a matte surface. When the textured matte surface 14a (that is, the texture) of the release sheet 14, 214 is applied to the decorative laminate 100 as discussed below in greater detail, the top surface 16a of the decorative laminate 100 is imparted with a texture 16t (that is, the decorative laminate 100 is provided with a textured surface) the same as the texture of the textured matte surface 14a, 214a of the release sheet 14, 214 making the laminate 100 less susceptible to the formation of annoying and undesirable fingerprints thereon.

Summarizing, when such texture 16t is applied to the top surface 16a of the decorative laminates 100 so as to provide for a textured top surface, the resulting characteristics result in the formation of a laminate not susceptible to the formation of annoying and undesirable fingerprints.

As the textured matte surface 14a, 214a of the release sheet 14, 214 is ultimately imparted to the top layer (that is, the texture 16t of the top surface 16a of the overlay paper layer 16 in accordance with an embodiment of the present invention) of the decorative laminate 100 formed using the textured release sheet 14, 214, the resulting decorative laminate 100 is provided with a top surface 16a having texture 16t that is the same as that of the textured surface 14a, 214a and will exhibit desired resistance to the formation of fingerprints.

In accordance with one embodiment of the present invention, and as discussed above, the decorative laminate 100 includes an exterior overlay layer sheet 16, or top layer, a decorative sheet 18 and a core 20. While a specific layering pattern is disclosed in accordance with a preferred embodiment of the present invention, the layering pattern may be varied, somewhat, without departing from the spirit of the present invention.

The overlay paper layer 16 is preferably a melamine-formaldehyde impregnated paper layer. The overlay paper layer 16 is preferably manufactured from a low basis weight transparent sheet impregnated with resin, for example, melamine-formaldehyde. Before impregnation with resin, the paper of the overlay paper layer is it is treated with electron beam irradiation to prepare the surface of the paper for resin impregnation and interaction with the textured release sheet. As with the PET film discussed above, this treatment improves the wettability of the paper of the overlay paper layer. The resin impregnated overlay paper layer 16 is subsequently dried, partially cured and finally cut into sheets. In accordance with a preferred embodiment, the overlay paper layer 16 is B-stage cured and is then coated with a UV curable epoxy acrylic or urethane acrylic film 16f that is also partially cured (and ultimately defines the top surface 16a of the overlay paper layer) prior to the platen pressing process that ultimately completes the curing process. While the paper may exhibit opaque properties prior to heating and pressing, the overlay paper layer 16 in the final fabricated laminate is preferably transparent to permit viewing of the decorative sheet 18 positioned directly beneath the overlay paper layer 16. The overlay paper used in accordance with an embodiment of the present invention is a low weight basis alpha-cellulose paper with a high porosity for resin absorption. The decorative layer 18 is a conventional pattern sheet positioned directly beneath the overlay paper layer 16. When the decorative laminate 100 is fully heated and pressed, as will be discussed below in greater detail, the overlay paper layer 16 becomes translucent, fully exposing the decorative layer 18. In addition, it is the top surface 16a of the overlay paper layer 16 which takes on the texture 16t imparted by the release sheet 14. With this in mind, the decorative layer 18 is substantially responsible for the aesthetic appearance of the finished decorative laminate 100.

Decorative layers 18 are chosen from a wide array of sheets. For example, the decorative layer 18 may be a solid color (for example, white) or include an aesthetically appealing pattern. As discussed above, the decorative layer 18 provides the decorative laminate 100 with an attractive appearance. The overlay paper layer 16 and the decorative layer 18 also dictate the surface characteristics of the final decorative laminate 100. For example, the composition of the overlay paper layer 16 and decorative layer 18 help to dictate the decorative laminate's resistance to chemical agents, heat, light, shock and abrasion.

Decorative sheets 18 are commonly manufactured from high quality 80-202 grams per square meter ream weight, pigment filled, alpha cellulose paper impregnated with a water alcohol or water solution of melamine-formaldehyde resin. The resin impregnated decorative sheets 18 are subsequently dried, partially cured, and finally cut into sheets. The pigment filled, alpha cellulose paper of the decorative sheet, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate.

The core layer 20 is preferably composed of a plurality of phenolic resin impregnated sheets 20a, 20b, 20c, although other materials may be used without departing from the spirit of the present invention. For example, the core layer 20 includes sheets of 120-323 grams per square meter dry phenolic resin impregnated Kraft paper. The Kraft paper is impregnated throughout and bonded with a substantially cured phenolic resin which is converted to a thermoset state during the initial laminating step.

In accordance with an embodiment of the present invention, the decorative laminate 100 of the present invention is formed in much the same manner as conventional decorative laminates. While the following discloses use of the release sheet 14 described with reference to FIGS. 1 to 6B, and as discussed above, it is appreciated the release sheet 214 disclosed with references to FIGS. 7A, 7B & 7C would be used in a similar manner. The layers are first stacked and placed between steel plates with the release sheet 14 covering the overlay paper layer 16. The decorative laminate lay-up (or stack) 10 is then subjected to temperatures in the range of 121° C.-160° C. and pressures of about 56.24 kg/cm$^2$ to 112.48 kg/cm$^2$ for a time sufficient to consolidate the laminate and cure the resins (generally about 25 minutes to an hour).

The pressure and heat force the resin in the paper sheets to flow, cure and consolidate the sheets into a unitary laminated mass referred to in the art as a decorative high pressure laminate 100 having the hydrophobic textured surface 16t as described above which is imparted by the textured matte surface 14a of the release sheet 14. Generally, more than one decorative laminate is formed at one time. As shown with reference to FIG. 3, multiple decorative laminates are formed by inserting a plurality of lay-ups 10 in a stack. Conventional sheets 40 are positioned between the core lays 20 of the lay-ups 10 to separate the various decorative laminates stacked together. The textured matte surface 14a of the release sheet 14 is oriented against the top surface 16a (in this case the upper surface of the overlay paper layer 16 as defined by the UV curable epoxy acrylic or urethane acrylic film 16f) of the decorative laminate sheet assembly 12, be it the decorative sheet 18 (as discussed below with reference to an alternate embodiment) or the overlay paper layer 16, with the smooth top side (or back surface) 14t of the textured release sheet 14 positioned against the steel plate 30. A standard release sheet 40 is positioned between the adjacent lay-ups 10 along the core layer sides. Upon pressing between suitable laminate press plates, the textured release sheet 14 imparts the matte texture 16t described above to the top surface 16a of the first lay-up layer (in this case the upper surface of overlay paper layer 16 as defined by the UV curable epoxy acrylic or urethane acrylic film 16f thereby creating the textured surface 16t discussed above), and serves to allow release between the first lay-up and the adjacent lay-up. A platen press assembly, as is well known in the lamination art, provides the necessary heat and/or pressure during lamination. After consolidation, the release sheets allow the individual decorative laminates to be separated.

As discussed above, and with reference to FIGS. 4 and 5, the decorative laminate 100 of an embodiment of the present invention may be manufactured without the overlay. The decorative laminate 100 is manufactured with the formation of a decorative laminate lay-up 10 including a decorative laminate sheet assembly 12 composed of a decorative layer 18 and a core layer 20. The core layer 20 is the same as discussed with regard to the embodiments disclosed with reference to FIGS. 1 to 3. The decorative layer 18 is the same as discussed above with the exception that, after the resin impregnated decorative sheet is B-stage cured, it is coated with a UV curable epoxy acrylic or urethane acrylic film 18f that is also partially cured (and ultimately defines the top surface 18a of the decorative layer 18) prior to the platen pressing process that ultimately completes the curing process.

The manufacture of the decorative laminate in accordance with this embodiment also requires a texture imparting member in the form of a textured release sheet 14 (including a top side 14t and a bottom side 14b) as discussed above with regard to the embodiment disclosed with reference to FIGS. 1 to 3. Briefly, and as discussed above in detail, the textured release sheet 14 includes a textured matte surface 14a (formed on the bottom side 14b thereof) and applies the textured matte surface 14a to a resulting decorative laminate 100, wherein the textured matte surface 14a imparts the matte texture in a decorative laminate 100 that exhibits the matte appearance and is not susceptible to a build-up of fingerprints on the surface thereof. The release sheet 14 also functions as a release sheet between decorative laminate sheet assemblies 12.

The decorative laminate lay-up 10 is assembled by first stacking a decorative laminate sheet assembly 12 having a top layer (which, as explained below, is preferably the UV curable epoxy acrylic or urethane acrylic film 18f of the decorative layer 18). The textured release sheet 14 is also prepared.

In practice, the finished release sheet 14 is positioned on the top surface 18a (in the case of the present laminate sheet assembly 12 it is positioned on the upper surface of the decorative layer 18) of the laminate sheet assembly 12 to form the laminate lay-up 10. The release sheet 14 is positioned on the decorative layer 18 with the bottom side 14b (that is, the textured matte surface 14a) of the release sheet 14 facing the top surface 18a of the decorative layer 18. Heat and pressure are then applied to the laminate sheet assembly 12 and the textured release sheet 14 sufficient to bond the layers of the decorative laminate sheet assembly 12, and releasably bond the textured release sheet 14 (in particular, the bottom side 14b with the textured matte surface 14a) to the top surface 18a of the decorative laminate sheet assembly 12. Finally, the textured release sheet 14 is removed from the top layer 18a of the formed decorative laminate 100 to reveal a decorative laminate 100 exhibiting desired matte texture characteristics.

In accordance with an embodiment of the present invention, and as discussed above, the release sheet 14 is formed with a textured matte surface 14a on the bottom side 14b thereof (the texture of which is ultimately applied to the top surface 18a of the decorative laminate 100) exhibiting matte surface characteristics leading to a fingerprint proof surface, that is, a surface not showing fingerprints and remaining clean and clear despite regular use.

The texture of the textured matte surface 14a applied to the release sheet 14 is ultimately applied to the top surface 18a of the resulting decorative laminate 100 as texture 18t resulting in a textured top surface 18a of the resulting decorative laminate 100 with a matte surface. When the textured matte surface 14a (that is, the texture) of the release sheet 14 is applied to the decorative laminate 100, the top surface 18a of the decorative laminate 100 is imparted with a texture 18t (that is, the decorative laminate 100 is provided with a textured surface) that is the same as the texture of the textured matte surface 14a of the release sheet making the laminate 100 less susceptible to the formation of annoying and undesirable fingerprints thereon.

In accordance with yet another embodiment of the present invention, the textured release sheet 14 of the above embodiments, may be used in conjunction with different decorative laminate lay-up 310 employing a decorative layer 318 having a UV/thermal cured coating 318c applied to a decorative sheet substrate 318s. While the following discloses use of the release sheet 14 described with reference to FIGS. 1 to 6B, and as discussed above, it is appreciated the release sheet 214 disclosed with references to FIGS. 7A, 7B & 7C would be used in a similar manner.

In particular, and with reference to FIGS. 8, 9, and 10, a decorative laminate lay-up 310 including a release sheet 14 and a decorative laminate sheet assembly 312 composed of a decorative layer 318 and a core layer 320 as discussed below in greater detail is disclosed. The decorative laminate lay-up 310 is used in the manufacture of decorative laminates 400 (see FIG. 9) in accordance with the present invention.

Although this embodiment discloses a decorative laminate manufactured without an overlay paper layer, it is appreciated the present invention may be adapted for decorative laminates including an overlay paper layer. In accordance with such a variation, the UV/thermal cured coating would be applied to the overlay paper layer instead of the decorative layer.

Figure 8:
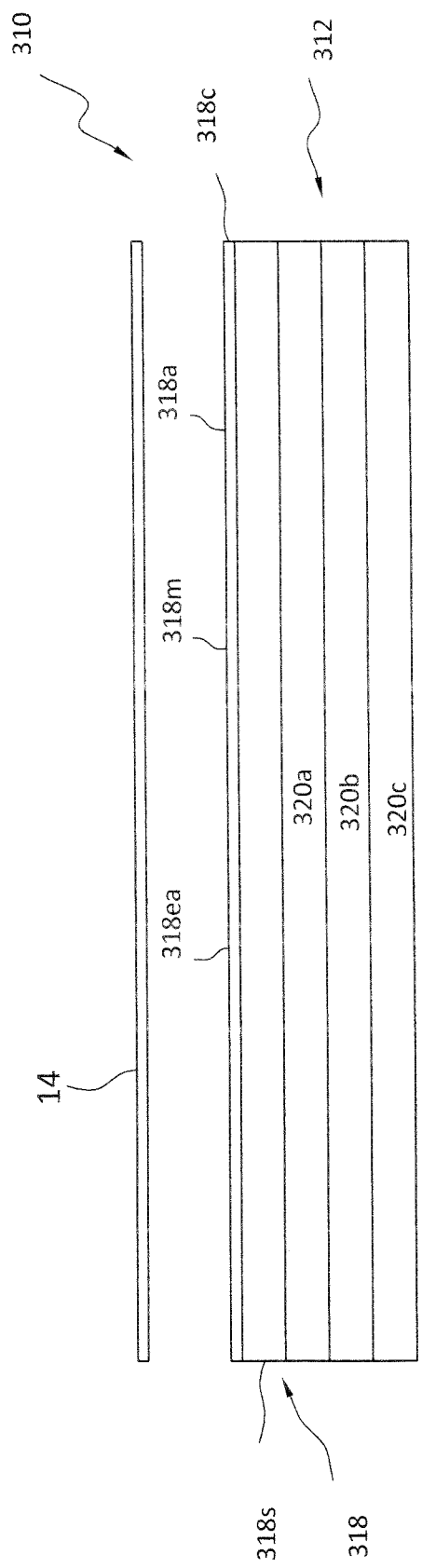
FIG. 8 is a schematic of a laminate lay-up in accordance with another embodiment of the present invention.
Figure 9:
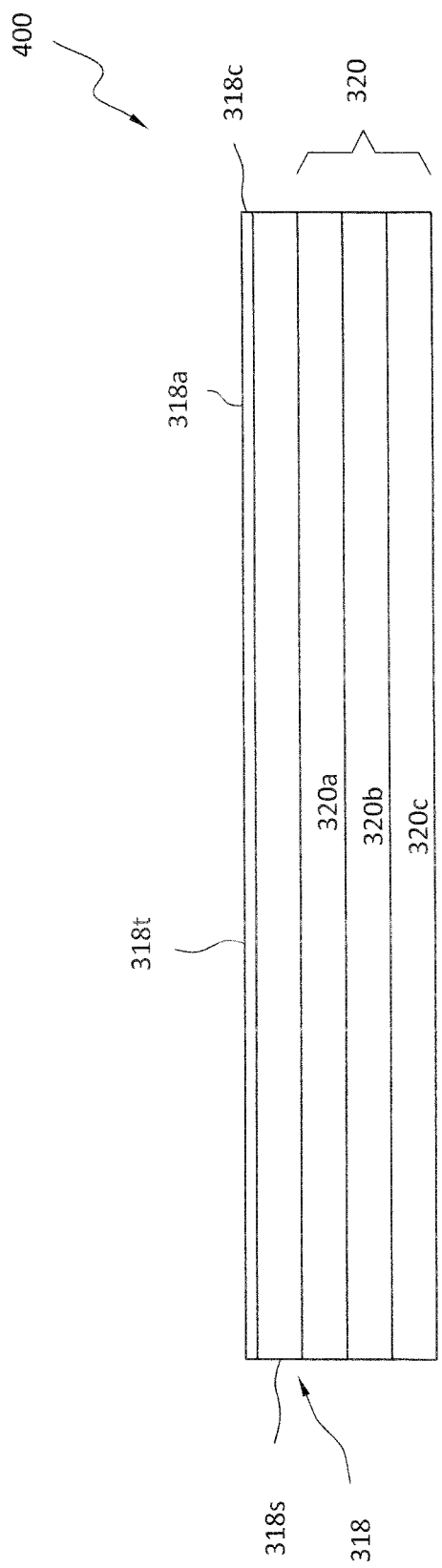
FIG. 9 is a schematic of the high pressure decorative laminate produced in accordance with the embodiment of FIG. 8.

With reference to FIGS. 8 to 10, the decorative layer 318 of this embodiment employs a solvent-free and non-aqueous lacquer (in accordance with the present invention the lacquer is preferably a UV/thermal curable epoxy acrylic or urethane acrylic (which is referred to below as the acrylate mixture)) in the production of the UV/thermal cured coating 318c on the decorative layer 318. In accordance with a preferred embodiment, and as will be discussed below in greater detail, the decorative layer 318 includes a base composed of a melamine-formaldehyde resin impregnated decorative sheet substrate 318s.

The decorative layer 318, and ultimately the decorative laminate 400, of this embodiment are produced through the implementation of a multi-stage curing process. The substrate 318s of the decorative layer 318 is chosen from a wide array of decorative sheets. For example, the decorative sheet substrate 318s may be a solid color (for example, white) or include an aesthetically appealing pattern. As discussed above, the decorative layer 318 provides the decorative laminate 400 with an attractive appearance.

The decorative sheet substrate 318s in accordance with the present embodiment is manufactured from high quality 80-202 grams per meter squared ream weight, pigment filled, alpha cellulose paper impregnated with a water alcohol or water solution of melamine-formaldehyde resin. As with the overlayer paper layer of the prior embodiment, before impregnation with resin, the paper of the decorative sheet substrate is it is treated with electron beam irradiation to prepare the surface of the paper for resin impregnation and interaction with the textured release sheet. As with the PET film discussed above, this treatment improves the wettability of the paper of the decorative sheet substrate. The resin impregnated decorative sheet substrate 318s is subsequently dried, partially cured, and finally cut into sheets. The pigment filled, alpha cellulose paper of the decorative sheet substrate 318s, may include a solid color, a decorative design, or a photo-gravure reproduction of natural materials, such as, wood, marble, leather, etc. The aesthetic characteristics of the cellulose paper are revealed as the laminate's decorative design upon completion of the decorative laminate 400.

Once the decorative sheet substrate 318s is prepared (in a traditional manner) as described above, the UV/thermal curable epoxy acrylic or urethane acrylic 318ea (which is ultimately cured to form the textured coating layer 318c) is applied upon the decorative sheet substrate 318s and is irradiated with UV-radiation to a create UV-irradiated layer 318m. In accordance with an alternate embodiment, the epoxy acrylic or urethane acrylic 318ea may be irradiated with electron beam radiation or by a combination of UV and electron beam radiation. However, and regardless whether UV-radiation is applied or electron beam radiation is application, the irradiation is applied so that epoxy acrylic or urethane acrylic 318ea is only partially cured. The epoxy acrylic or urethane acrylic 318ea is partially cured to the extent the epoxy acrylic or urethane acrylic 318ea is no longer tacky but before the epoxy acrylic or urethane acrylic 318ea is cured to the extent the epoxy acrylic or urethane acrylic 318ea begins curling due to too much curing.

In accordance with a preferred embodiment, the epoxy acrylic or urethane acrylic 316ea is preferably applied to the substrate 316s by a roller, with a layer coating thickness of greater than 30 microns and up to approximately 150 microns (preferably, 40 to 80 microns), wherein the acrylate mixture, in accordance with one embodiment, has the following composition:

| | |
|---|---|
| 42% | Ebecryl ® 294/HD 25 (an aliphatic urethane triacrylate oligomer diluted with 1,6-hexanediol diacrylate (HDDA)(1) monomer.). |
| 38% | Ebecryl ® 5129 (a hexafunctional aliphatic urethane acrylate oligomer which provides fast cure response when exposed to ultraviolet light or electron beam.). |
| 9% | Ebecryl ® 8209 (a Sn-free aliphatic urethane acrylate oligomer which provides extremely fast cure response when exposed to ultraviolet (UV) light or electron beam (EB).). |
| 5% | HDDA/TMPTA (Hexanediol diacrylate (HDDA) is a difunctional reactive diluent that is commonly used as a component of ultraviolet light (UV) and electron beam (EB) curable coatings and inks. Trimethylolpropane triacrylate (TMPTA) is a trifunctional monomer used for its low volatility and fast cure response.) |
| 2% | Photoinitiator |
| 2% | Cerafak 127N (a Fischer Tropsch wax dispersion. Provides improved water repellence properties.). |
| 1% | TBPB (tert-Butyl peroxybenzoate (TBPB) a chemical compound from the group of peresters which functions as a radical initiator in a polymerization process. |
| 1% | Modaflow 9200 (an acrylic flow modifier, without silicone addition. It improves flow and leveling, substrate wetting, or maintains high gloss and substrate and inter-coat adhesion, and facilitates pigment dispersion). |

In addition to the curing facilitated by the application of the UV and/or electron beam radiation, the acrylate mixture of this embodiment requires a final thermal curing step to fully cure the coating layer 318c. As will be explained below, the decorative layer 318, with the UV-irradiated layer 318m thereon, is ultimately subjected to heat and pressure when the laminate lay-up is subjected to conventional high pressure laminate manufacturing through the application of pressure via press plates under traditional heating conditions. The need for the final heat curing results from the inclusion of peroxide in the acrylate mixture.

As mentioned above, the laminate sheet assembly also includes a core layer 320. The core layer 320 is preferably a plurality of phenolic resin impregnated sheets 320a, 320b, 320c, although other materials may be used without departing from the spirit of the present invention. For example, the core layer 320 includes sheets of 120-323 grams per square meter dry phenolic resin impregnated Kraft paper. The Kraft paper is impregnated throughout and bonded with a substantially cured phenolic resin which has been converted to a thermoset state during the initial laminating step.

With components of the laminate sheet assembly 312, including the decorative layer 318 and the core layer 320 as discussed above, and the finished release sheet 14 prepared (as discussed above with reference to the prior embodiments disclosed with reference to FIGS. 1 to 6B), the finished release sheet 14 is positioned on the top surface 318a (in the case of the present laminate sheet assembly 312 it is positioned on the top surface 318a of the decorative layer 318, that is the UV-irradiated layer 318m) of the laminate sheet assembly 312 to form the laminate lay-up 310. The release sheet 14 is positioned on the exposed surface of the UV-irradiated layer 318m of the decorative layer 318 with the bottom side 14b (that is, the textured matte surface 14a) of the release sheet 14 facing the top surface 218a of the decorative layer 218.

It should be noted that in the practice of this embodiment when using the release sheet disclosed with reference to FIGS. 1 to 6B, the $TiB_2$ coating described above is not desired. As such, the release sheet would be produced the same as described above with the final step of applying the $TiB_2$ coating skipped.

Heat and pressure are then applied to the laminate sheet assembly 312 and the textured release sheet 14 using press plates in a conventional manner. The heat and pressure are applied in manner sufficient to bond the layers of the decorative laminate sheet assembly 312, and releasably bond the textured release sheet 14 (in particular, the bottom side 14b with the textured matte surface 14a) to the top surface 318a of the decorative laminate sheet assembly 312. The heat and pressure also effectuate the final curing of the epoxy acrylic or urethane acrylic 316ea. Finally, the textured release sheet 14 is removed from the top layer 318a of the formed decorative laminate 300 to reveal a decorative laminate 400 exhibiting desired matte texture characteristics.

In accordance with the present invention, and as discussed above, the release sheet 14 is formed with a textured matte surface 14a on the bottom side 14b thereof (the texture of which is ultimately applied to the top surface 318a of the decorative laminate 400) exhibiting matte surface characteristics leading to a fingerprint proof surface, that is, a surface not showing fingerprints and remaining clean and clear despite regular use. As discussed above, the release sheet 14 is preferably an acrylic coated PET sheet, the acrylic coating of which is applied in accordance with the procedure disclosed in the '408 publication.

The texture of the textured matte surface 14a applied to the release sheet 14 is ultimately applied to the top surface 318a of the resulting decorative laminate 400 as texture 318t resulting in a textured top surface 318a of the resulting decorative laminate 400) with a matte surface. When the textured matte surface 14a (that is, the texture) of the release sheet 14 is applied to the decorative laminate 400 as discussed below in greater detail, the top surface 318a of the decorative laminate 400 is imparted with a texture 318t (that is, the decorative laminate 400 is provided with a textured surface) the same as the texture of the textured matte surface 14a of the release sheet 14 making the laminate 400 less susceptible to the formation of annoying and undesirable fingerprints thereon. As such, the present invention provides a new product which offers a non-melamine formaldehyde surface.

In accordance with the present invention, the decorative laminate 400 of the present invention is formed in much the same manner as conventional decorative laminates. The layers are first stacked and placed between steel plates with a release sheet 14 covering the decorative layer 318 as described above. The decorative laminate lay-up (or stack) 310 is then subjected to temperatures in the range of 121° C.-160° C. and pressures of about 56.24 kg/cm$^2$ to 112.48 kg/cm$^2$ for a time sufficient to consolidate the laminate and cure the resins (generally about 25 minutes to an hour).

The pressure and heat force the resin in the paper sheets to flow, cure and consolidate the sheets into a unitary laminated mass referred to in the art as a decorative high pressure laminate 300 having the hydrophobic textured surface 218t. Generally, more than one decorative laminate is formed at one time. As shown with reference to FIG. 9, multiple decorative laminates are formed by inserting a plurality of lay-ups 310 in a stack. A standard release sheet 340 is positioned between the adjacent lay-ups 310 along their core layer sides. A platen press assembly, as is well known in the lamination art, provides the necessary heat and/or pressure during lamination. After consolidation, the release sheets allow the individual decorative laminates to be separated.

While the preferred embodiments have been shown and described, it will be understood that there is no intent to limit the invention by such disclosure, but rather, it is intended to cover all modifications and alternate constructions falling within the spirit and scope of the invention.

The invention claimed is:

1. A laminate lay-up, comprising:
   a texture-imparting release sheet composed of a release sheet substrate, which has been electron beam treated to prepare a surface of the release sheet substrate for coating with a UV curable acrylate mixture to improve wettability of the substrate, the release sheet substrate including a top side and a bottom side; and
   a matte surface formed on the bottom side thereof, wherein the matte surface is a coating of a radiation curable material applied to the bottom side of the release sheet substrate, the coating being the UV curable acrylate mixture applied to the release sheet substrate, wherein the UV curable acrylate mixture is irradiated with UV-radiation via an excimer laser emitter to produce a UV-irradiated layer wherein the UV curable acrylate mixture is only crosslinked on the surface thereof, which produces a matting surface through the effects of a micro-convolution, wherein the coating is applied to the substrate and partially cured via UV-radiation to a create UV-irradiated layer and subsequently subjected to electron beam irradiation to crosslink and harden the entire layer;
   a decorative layer including a decorative sheet substrate and a coating comprised of a UV and thermal curable epoxy acrylic or urethane acrylic, wherein the decorative sheet substrate is electron beam treated prior to application of coating and the coating is partially cured to create an irradiated layer, the irradiated layer being subsequently fully cured via thermal curing when the laminate lay-up is pressed and heated;
a core layer composed of one or more sheets of paper impregnated with resin.

2. The laminate lay-up according to claim 1, wherein the UV curable acrylate mixture is applied to the release sheet substrate with a layer thickness of not more than 150 microns.

3. The laminate lay-up according to claim 2, wherein the epoxy acrylic or urethane acrylic is applied to the release sheet substrate with a layer thickness in the range between 30 and 100 microns.

4. The laminate lay-up according to claim 1, wherein the release sheet substrate is a PET film.

\* \* \* \* \*